United States Patent [19]
Boteler

[11] Patent Number: 6,144,537
[45] Date of Patent: Nov. 7, 2000

[54] ARCING FAULT AND GROUND FAULT INTERRUPTING DEVICE FOR BRANCH CIRCUITS AND EXTENSIONS

[75] Inventor: William C. Boteler, Bridgeport, Conn.

[73] Assignee: Hubbell Incorporated, Orange, Conn.

[21] Appl. No.: 09/113,182

[22] Filed: Jul. 10, 1998

[51] Int. Cl.[7] .................................................. H02H 3/00
[52] U.S. Cl. ............................................................. 361/42
[58] Field of Search ............................... 361/42–50, 62, 361/63

[56] References Cited

U.S. PATENT DOCUMENTS

| | | | |
|---|---|---|---|
| 3,911,323 | 10/1975 | Wilson et al. | 317/18 R |
| 4,766,549 | 8/1988 | Schweitzer, III et al. | 364/481 |
| 4,949,214 | 8/1990 | Spencer | 361/42 |
| 5,224,006 | 6/1993 | Mackenzie | 361/45 |
| 5,420,740 | 5/1995 | MacKenzie et al. | 361/45 |
| 5,453,723 | 9/1995 | Fello et al. | 335/18 |
| 5,459,630 | 10/1995 | MacKenzie et al. | 361/45 |
| 5,483,211 | 1/1996 | Carrodus et al. | 335/18 |
| 5,546,266 | 8/1996 | MacKenzie et al. | 361/93 |
| 5,691,869 | 11/1997 | Engel et al. | 361/42 |
| 5,751,524 | 5/1998 | Swindler | 361/42 |
| 5,861,683 | 1/1999 | Engel et al. | 307/38 |

*Primary Examiner*—Ronald W. Leja
*Attorney, Agent, or Firm*—Jerry M. Presson; Stacey J. Longanecker

[57] ABSTRACT

A fault detection device for an electrical distribution system employs a single arcing fault detection device which can be shared among a plurality of branch circuits. A scanning device is connected to the arcing fault detection device. A line conductor from each of the branch circuits is provided to the arcing fault detection device. A current transformer is provided for each branch circuit to monitor its line conductor and to provide an output signal to the scanning device. The scanning device polls each current transformer for an output signal for a selected number of cycles and provides the output signal to the arcing fault detection device. The arcing fault detection device analyzes the output signals and, upon detection of an arcing fault condition in a branch circuit, shunts the line conductor of that branch circuit to ground via a resistance to induce ground fault condition in the ground fault interrupting device for that branch circuit.

3 Claims, 3 Drawing Sheets

ARCING FAULT AND GROUND FAULT INTERRUPTING DEVICE FOR BRANCH CIRCUITS AND EXTENSIONS

BACKGROUND OF THE INVENTION

In a residential, commercial or industrial electrical system, electrical power is typically delivered from a utility source to a panelboard. Electrical power is then provided via the panelboard to one or more branch circuits, each of which supplies power to one or more loads. Various types of protective devices can be installed on the panelboard to reduce the likelihood of damage from excessive heat or fire, for example, as well as reduce risk of injury from electric shock.

Circuit breakers are generally provided for each branch circuit on a panelboard for overload protection and short circuit protection. Overload occurs when too many loads simultaneously draw power from the same branch circuit, or when a single load draws more power than the branch circuit is designed to carry. A circuit breaker can be provided with a thermal element, which becomes heated by an increase in current from an overload condition. The thermal element causes the circuit breaker to trip and interrupt power when heated beyond a predetermined threshold. With regard to short circuit conditions, a circuit breaker can be provided with an electromagnetic device for sensing high current flow and for tripping the circuit breaker and thereby interrupting power when current exceeds a predetermined threshold.

Many circuit breakers are designed to protect against ground faults, that is, when current flows from a hot conductor to ground through a person or an object. Such current flow can be dangerous to a human being because it can cause heart fibrillation. Circuit breakers which operate as ground fault circuit interrupters (GFCIs) are therefore designed with a fast response time to trip and interrupt power very quickly upon detection of a ground fault condition.

Arcing faults are commonly defined as current through ionized gas between two ends of a broken conductor, between two conductors supplying a load, or between a conductor and ground. A number of conditions can cause an arcing fault such as corroded, worn or aged wiring or insulation, a loose connection, wiring damages by a nail or staple in the insulation, and electrical stress from repeated overload conditions or lightning, among other conditions. A problem exists in many electrical distribution systems because arcing faults do not cause the corresponding circuit breaker to trip. Arcing fault current levels are sometimes reduced by branch circuit or load impedance to a level below the trip curve settings of the circuit breaker for that branch circuit. Further, an arcing fault which does not contact a ground conductor or person may not trip a GFCI. Accordingly, a number of existing electrical distribution systems employ a circuit breaker and a separate arcing fault detection device for each branch circuit on a panelboard, resulting in unnecessary redundancy in panelboard components and their functions. For example, FIG. 1 depicts an existing electrical distribution system which provides an arc detector 10*a*, 10*b*, . . . 10*n* and a circuit breaker or line interrupter 22*a*, 22*b*, . . . 22*n* for respective ones of a plurality of branch circuits 1*a*, 1*b*, . . . 1*n*.

A need exists for a fault protection device for an electrical distribution system which detects ground faults and arcing faults with improved accuracy. A need also exists for a fault detection device for an electrical distribution system which reduces redundancy of protective devices on a panelboard.

SUMMARY OF THE INVENTION

In accordance with an aspect of the present invention, a fault detection device for an electrical distribution system is provided which comprises a ground fault interrupting device for each branch circuit and a common arcing fault detection device for use with a plurality of the branch circuits.

In accordance with another aspect of the present invention, the arcing fault detection system is configured to induce a ground fault condition upon detection of an arcing fault which causes a ground fault protection device to interrupt power to the loads in the branch circuit. The arcing fault detection device is configured to analyze several cycles of a current signal on a branch circuit line conductor before the ground fault protection device operates to shut down the branch circuit exhibiting an arcing fault.

In accordance with an embodiment of the present invention, a fault detection device for an electrical distribution system comprises a ground fault interrupting device for each of one or more branch circuits. The fault detection device for the electrical distribution system further comprises a single arcing fault detection device which can be shared among a plurality of branch circuits. A scanning device is connected to the arcing fault detection device. A line conductor from each of the branch circuits is provided to the arcing fault detection device. A current transformer is provided for each branch circuit to monitor its line conductor and to provide an output signal to the scanning device. The scanning device polls each current transformer for an output signal for a selected number of cycles and provides the output signal to the arcing fault detection device. The arcing fault detection device analyzes the output signals and, upon detection of an arcing fault condition in a branch circuit, shunts the line conductor of that branch circuit to ground via a resistance to induce a ground fault condition in the ground fault interrupting device for that branch circuit.

BRIEF DESCRIPTION OF THE DRAWINGS

These and other features and advantages of the present invention will be more readily comprehended from the following detailed description from the following detailed description when read in connection with the appended drawings, which form a part of this original disclosure, and wherein.

DETAILED DESCRIPTION OF THE PREFERRED EMBODIMENTS

Figure 1:
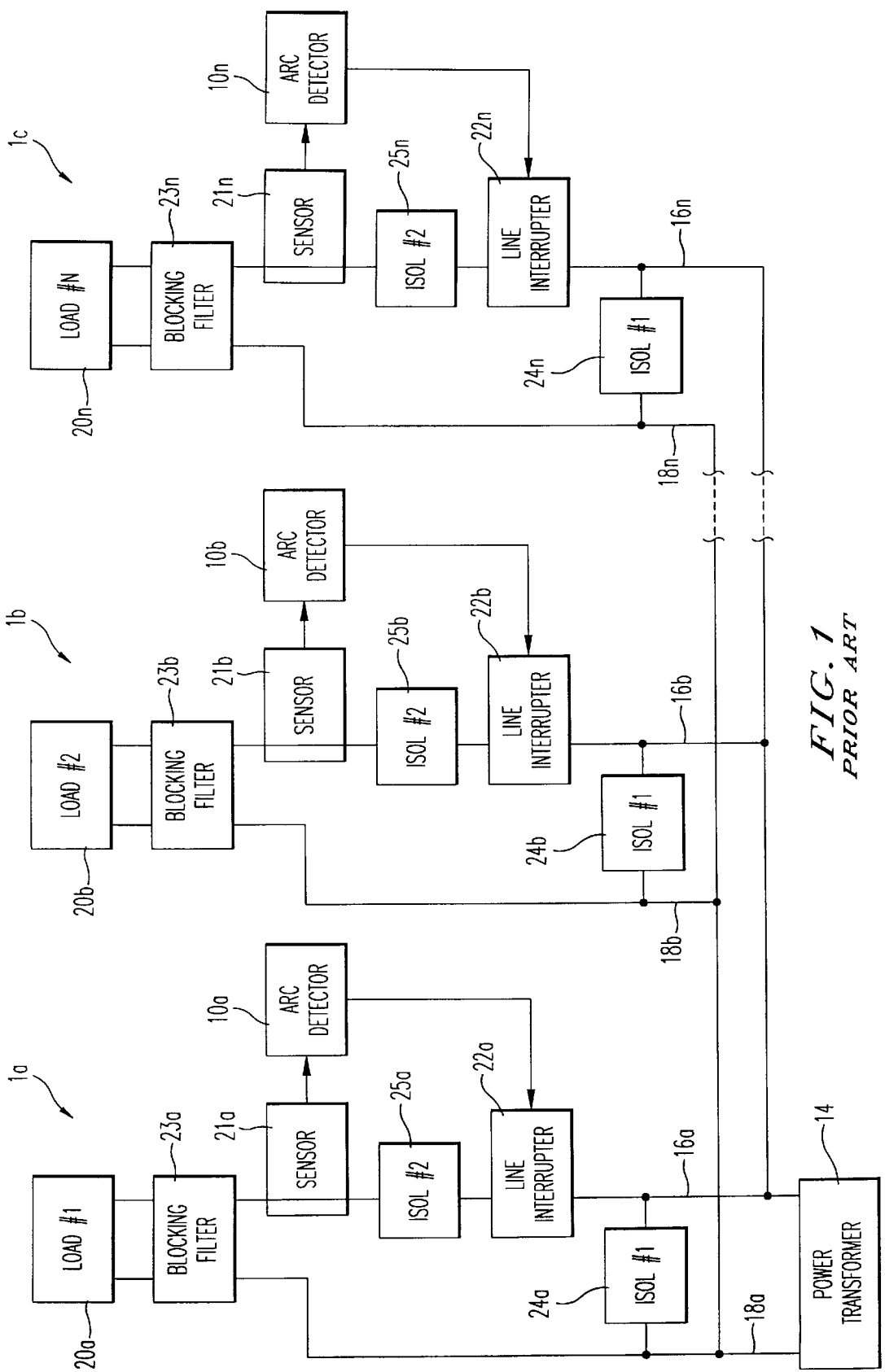
FIG. 1 is a block diagram of a prior art fault detection system for an electrical distribution system.
Figure 2:
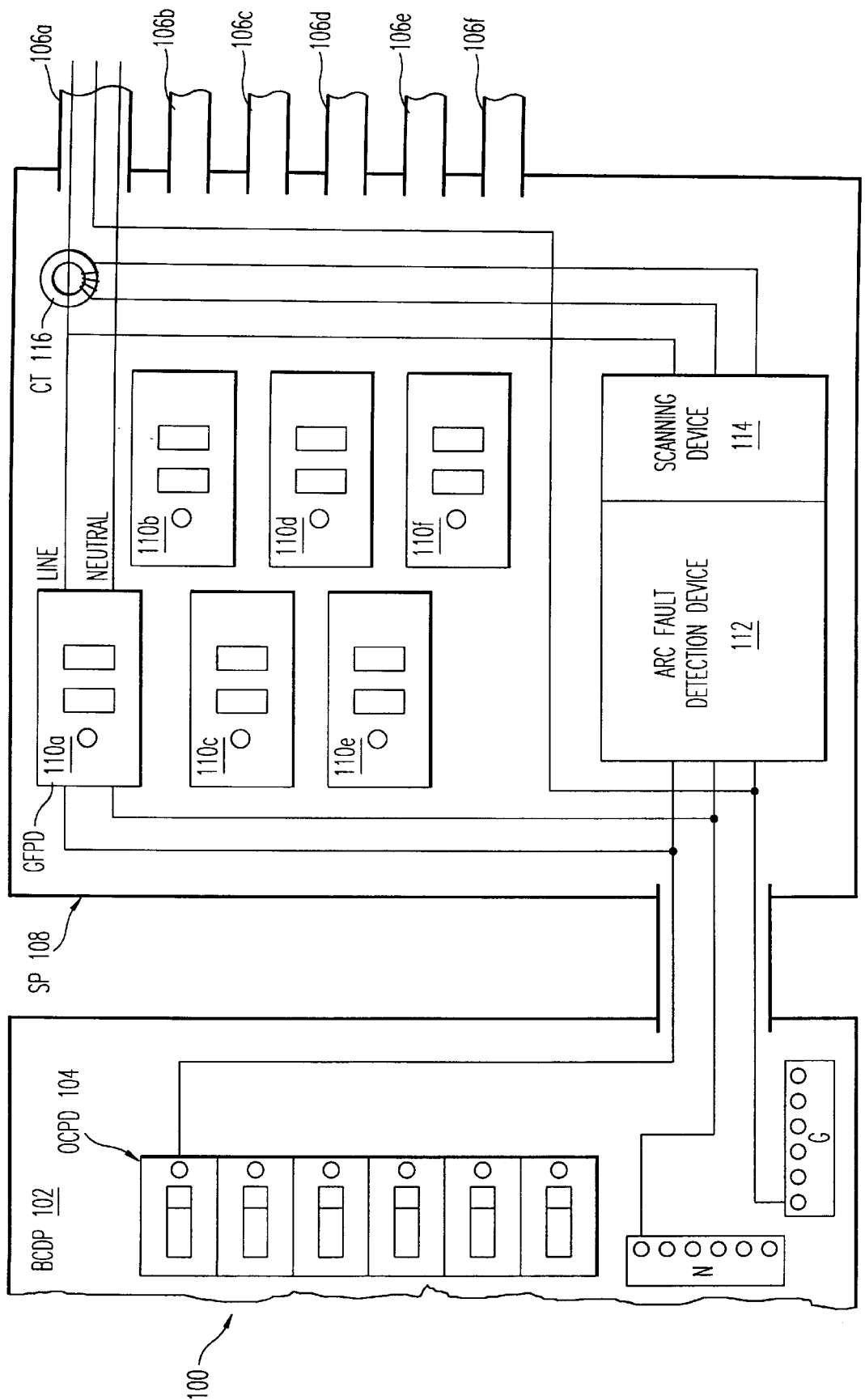
FIG. 2 is a block diagram of a fault detection device for an electrical distribution system constructed in accordance with an embodiment of the present invention.

With reference to FIG. 2, an exemplary electrical distribution system 100 is illustrated which comprises a branch circuit distribution panel (BCDP) 102 having a plurality of 15 or 20 ampere overcurrent protection devices (OCPDs) 104*a*, 104*b*, 104*c*, 104*d*, 104*e* and 104*f*. The BCDP 102 receives electrical power from a utility source (not shown) through at least one line bus (not shown) and a neutral bus N, which distributes line power to branch circuits originating at the BCDP 102. The neutral bus N is used for connection of grounded circuit conductors. An equipment grounding bus G is provided for connecting equipment grounding conductors. The OCPDs 104*a*, 104*b*, 104*c*, 104*d*, 104*e* and 104*f* provide short circuit and overcurrent protection for respective ones of the branch circuits. In the illustrated embodiment, six branch circuits 106a, 106b, 106c, 106d, 106e and 106f are shown. It is to be understood that the number of branch circuits can be greater or fewer than six in number. The OCPDs 104a, 104b, 104c, 104d, 104e and 104f can be the fusible-type or the thermal/magnetic-type or the magnetic-type of OCPD.

With continued reference to FIG. 2, a sub-panel (SP) 108 is connected to the BCDP 102. The SP 108 comprises at least one, and preferably a plurality, of the ground fault protection devices (GFPD) 110a, 110b, 110c, 110d, 110e and 110f, which are provided for respective ones of the branch circuits 106a, 106b, 106c, 106d, 106e and 106f. The GFPDs 110a, 110b, 110c, 110d, 110e and 110f can each be a GFCI module such as Catalog No. GFM20 which is commercially available from Hubbell Incorporated, Orange, Conn. Each of the GFPDs 110a, 110b, 110c, 110d, 110e and 110f preferably provides ground fault protection at the personnel protection level (i.e., current is not to exceed 4–6 milliamperes) or at the equipment protection level (i.e., current is not to exceed 30 milliamperes or other level), depending on the application for the electrical distribution system. Each of the GFPDs 110a, 110b, 110c, 110d, 110e and 110f also provides protection against the alternate grounding path of a grounded neutral for a branch circuit wired therethrough.

The SP 108 also comprises an arcing fault detection device (AFDD) 112 and a scanning device 114. For illustrative purposes, the wiring of only one branch circuit with regard to the SP 108 is shown in FIG. 2. It is to be understood that the wiring for the other branch circuits is the same as illustrated in FIG. 2 and described herein. The AFDD 112 monitors line current for a branch circuit and determines if an arcing fault exists. Arcing fault detection can be determined, for example, in a manner as disclosed in U.S. Pat. No. 5,682,101, which is incorporated herein by reference. Other arcing fault detection devices, however, can be used. The AFDD 112 is preferably capable of detecting parallel arcing faults at levels of 75 amperes or less and series faults at levels of 5 amperes or less. For reasons discussed below, the AFDD need not be configured to perform line interruption.

Figure 3:
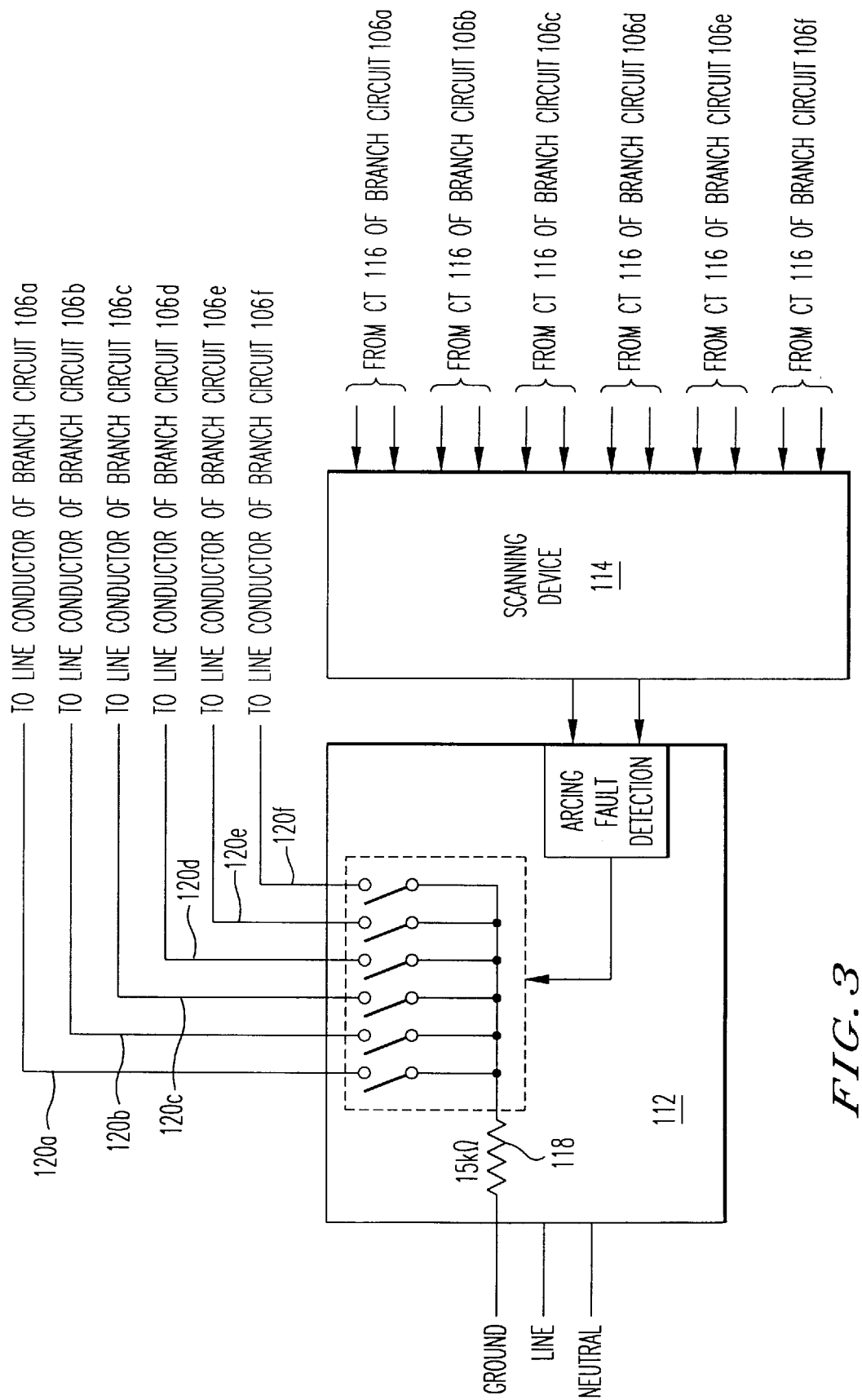
FIG. 3 is a block diagram of an arcing fault detection device and a scanning device constructed in accordance with an embodiment of the present invention.

In accordance with an aspect of the present invention, a current sensing device 116 such as a current transformer is provided on the line conductor extending from each of the GFPDs 110a, 110b, 110c, 110d, 110e and 110f. The current sensing device 116 is preferably an electromagnetic-type of device such as a toroidal transformer with a core of magnetic material or an air core, an inductor, a transformer with a laminated core of magnetic material, or inductors mounted on printed circuit boards. The output lines from each current sensing device 116 are provided to the scanning device 114, as shown in FIG. 3. The scanning device 114 preferably monitors the output lines from the current sensing device 116 of each branch circuit 106a, 106b, 106c, 106d, 106e and 106f for a given number of current or voltage signal cycles. The scanning device 114 is preferably configured to provide the frequency signals generated by each current sensing device in the respective branch circuits to the arcing fault detection device 112 in a sequential or round-robin manner. Other devices for supplying line conductor current information from the branch circuits to the AFDD 112, however, can be used. The scanning device does not have to be configured with a clock board because the determination of the number of cycles in a given period of time (e.g., one second) is not required to detect an arcing fault and then interrupt the branch circuit in which the arcing fault occurred. The scanning device preferably only counts the cycles of a current or voltage signal as measured in a branch circuit, before switching to the next branch circuit to count the cycles of a current or voltage signal.

For each branch circuit 106a, 106b, 106c, 106d, 106e and 106f, the scanning device 114 preferably provides several cycles of the output signal from the corresponding current sensing device 116 to the AFDD 112 to facilitate arcing fault detection. In accordance with one embodiment of the invention, the arcing fault detection device 112 is configured to monitor the rate of change of electrical current in the respective line conductors of the branch circuits 106a, 106b, 106c, 106d, 106e and 106f and produce a pulse signal each time the rate of change increases above a selected threshold. The pulses are filtered to eliminate signals outside a selected frequency range and then monitored to detect when the number of pulses that occur within a selected time interval exceeds a predetermined threshold. The pattern of fluctuations in the rate of change of current on a line conductor of a branch circuit 106a, 106b, 106c, 106d, 106e or 106f indicates whether the condition of the branch circuit is a normal event or an arcing fault event. The AFDD 112 preferably uses current signal characteristics obtained from a branch circuit to detect an arcing fault, as opposed to voltage signal characteristics, because a significant change in voltage due to an arcing fault generally will not be detected if a strong source is used.

In accordance with another aspect of the present invention, the arcing fault detection device 112 is connected to the ungrounded line conductor passing through the GFPD 110a, 110b, 110c, 110d, 110e and 110f of each branch circuit 106a, 106b, 106c, 106d, 106e and 106f directly by a conductor 120a, 120b, 120c, 120d, 120e and 120f, respectively, as well as indirectly via the corresponding current sensing device 116, as shown in FIG. 3. When an arcing fault event is detected by the arcing fault detection device 112, the arcing fault detection device 112 induces a ground fault sufficient to trip the GFPD 110 connected to the line conductor 120a, 120b, 120c, 120d, 120e or 120f on which the arcing fault event was detected. In accordance with one embodiment of the invention, the arcing fault detection device 112 is configured to shunt a selected one of the line conductors 120a, 120b, 120c, 120d, 120e and 120f to ground via a resistance 118 (e.g., a 15 kΩ resistor), as shown in FIG. 3. The GFPD 110a, 110b, 110c, 110d, 110e or 110f corresponding to the line conductor 120a, 120b, 120c, 120d, 120e or 120f on which the arcing fault event is detected is thereby tripped and performs ground fault interruption. A voltage signal on a line conductor 120a, 120b, 120c, 120d, 120e or 120f, for example, can be useful for timing purposes (i.e., counting current cycles) or determining the phase angle of an output signal from a branch circuit via the scanning device 114.

As stated previously, arcing faults include, for example, series arcs in either the line conductor or a neutral conductor in a branch circuit or parallel arcs between two line conductors, between a line conductor and ground or between a line conductor and neutral. GFCIs (e.g., GFPDs 110a, 110b, 110c, 110d, 110e and 110f) can trip at a low level (i.e., on the order of 4–6 milliamperes) when an arc occurs between a metal conduit or jacket, for example, and ground. GFCIs, however, generally do not monitor faults between two line conductors or between a line conductor and neutral. Use of the arcing fault detection device 112 is advantageous because the AFDD 112 monitors for arcing faults which are on the order of 5–75 amperes between line conductors or between a line conductor and neutral and which are merely viewed as a load by a GFCI. To accurately detect such arcing faults, however, a number of current cycles are preferably analyzed by the arcing fault detection device 112. The fast acting circuit interruption function of GFCIs to prevent injury from prolonged heart fibrillation generally precludes the monitoring of several current cycles in existing systems to accurately detect arcing faults. Accordingly, the combined ground fault and arcing fault detection of the present invention is advantageous because the arcing fault detection device 112 is permitted to monitor a number of current cycles via the current sensing devices 116 and the scanning device 114 before a ground fault condition is created by the arcing fault detection device to trip the corresponding GFPD 110. The GFPDs 110*a*, 110*b*, 110*c*, 110*d*, 110*e* and 110*f* are provided to continuously monitor the respective branch circuits 106*a*, 106*b*, 106*c*, 106*d*, 106*e* and 106*f* for ground faults and to interrupt a given branch circuit when a ground fault occurs therein. Similarly, the polling function of the scanning device 114 and the inducement of a ground fault in a selected branch circuit by the AFDD 112 permits a branch circuit, in which an arcing fault has occurred, to be interrupted without affecting other branch circuits. Thus, a series arcing fault through the load of another branch in a multi-branch circuit, for example, does not require shutting down the entire panelboard.

Further, only a single arcing fault detection device is used for several branch circuits by connecting the current sensing device 116 to each line conductor and using a scanning device 114. Since an arcing fault detection device does not by most codes and regulations require fast action upon detection of a fault, the AFDD 112 of the present invention can poll different branch circuits for arcing fault events. Since the AFDD 112 merely induces a ground fault to cause circuit interruption via a GFPD 110, the AFDD 112 need not have circuit interruption means incorporated therein. The need to use separate GFICs and arcing fault detectors, each having circuit interrupting or switching functions, for each branch circuit is therefore obviated.

While various embodiments have been chosen to illustrate the invention, it will be understood by those skilled in the art that various changes and modifications can be made therein without departing from the scope of the invention as defined in the appended claims.

What is claimed is:

1. An apparatus for detecting arcing faults in an electrical distribution system comprising:

at least one branch circuit having a line conductor and a neutral conductor;

a ground fault protection device connected to said branch circuit and operable to monitor for a ground fault in said branch circuit and to interrupt said branch circuit when a ground fault is detected;

an arcing fault detection device connected to said line conductor; and a current sensing device connected to said branch circuit for sensing a characteristic of current in said line conductor, said current sensing device being connected to said arcing fault detection device for providing an output signal corresponding to said characteristic of current thereto, said arcing fault detection device being configured to analyze said output signal to determine if an arcing fault event has occurred in said branch circuit and to shunt said line conductor to ground to trip said ground fault protection device when an arcing fault event has occurred;

a second branch circuit having a second line conductor and a second neutral conductor, said arcing fault detection device connected to both said line conductor and said second line conductor;

a second ground fault protection device connected to said second branch circuit and operable to monitor for a ground fault in said second branch circuit and to interrupt said second branch circuit when a ground fault is detected;

a second current sensing device connected to said second branch circuit for sensing a characteristic of current in said second line conductor, said second current sensing device being connected to said arcing fault detection device for providing a second output signal corresponding to said characteristic of current thereto; and a scanning device for providing at least a portion of said output signal and said second output signal to said arcing fault detection device;

wherein said arcing fault detection device is configured to analyze said output signal and said second output signal to determine if an arcing fault event has occurred in either of said branch circuit and said second branch circuit, respectively, and to shunt the corresponding one of said line conductor and said second line conductor in said branch circuit and said second branch circuit in which an arcing fault event has occurred to ground to trip respective said ground fault protection device and said second ground fault protection device.

2. An apparatus as claimed in claim 1, wherein said scanning device is configured to provide a selected number of cycles of at least one of a current signal or a voltage signal on said line conductor and said second line conductor to said arcing fault detection device.

3. An apparatus as claimed in claim 2, wherein said scanning device is configured to alternately provide said selected number of cycles of at least one of a current signal or a is voltage signal on said line conductor and said second line conductor to said arcing fault detection device.

\* \* \* \* \*